(12) United States Patent
Eikman (10) Patent No.: US 7,705,835 B2
(45) Date of Patent: Apr. 27, 2010

(54) PHOTONIC TOUCH SCREEN APPARATUS AND METHOD OF USE

(76) Inventor: Adam Eikman, 5116 Longfellow Ave., Tampa, FL (US) 33629

( * ) Notice: Subject to any disclaimer, the term of this patent is extended or adjusted under 35 U.S.C. 154(b) by 1007 days.

(21) Appl. No.: 11/390,769

(22) Filed: Mar. 28, 2006

(65) Prior Publication Data

US 2006/0227120 A1    Oct. 12, 2006

Related U.S. Application Data

(60) Provisional application No. 60/665,727, filed on Mar. 28, 2005.

(51) Int. Cl.
G06F 3/042    (2006.01)

(52) U.S. Cl. .................. 345/176; 345/173; 345/175; 178/18.01

(58) Field of Classification Search ............ 345/87, 345/92, 104, 156, 157, 163, 326, 173–176, 345/180, 419, 204, 66; 715/768, 781; 250/221; 358/473; 359/443; 341/5; 349/12, 24; 178/18.01, 178/19.01
See application file for complete search history.

(56) References Cited

U.S. PATENT DOCUMENTS

| | | | |
|---|---|---|---|
| 3,527,535 A | | 9/1970 | Monroe |
| 4,305,071 A | * | 12/1981 | Bell et al. ............... 345/176 |
| 4,346,376 A | * | 8/1982 | Mallos ................... 345/176 |
| 4,542,375 A | | 9/1985 | Alles et al. |
| 4,873,398 A | * | 10/1989 | Hubby, Jr. ............. 178/18.07 |
| 5,241,606 A | | 8/1993 | Horie |
| 5,578,817 A | | 11/1996 | Bidiville et al. |
| 6,008,800 A | * | 12/1999 | Pryor ..................... 345/173 |
| 6,166,370 A | | 12/2000 | Sayag |
| 6,172,667 B1 | | 1/2001 | Sayag |
| 6,255,643 B1 | | 7/2001 | Sayag |
| 6,259,108 B1 | | 7/2001 | Antonelli et al. |
| 6,320,177 B1 | | 11/2001 | Sayag |
| 6,355,937 B2 | | 3/2002 | Antonelli et al. |
| 6,927,384 B2 | | 8/2005 | Reime et al. |
| 6,948,820 B2 | | 9/2005 | Veligdan |
| 2004/0108990 A1 | * | 6/2004 | Lieberman et al. ..... 345/156 |

(Continued)

OTHER PUBLICATIONS

J.L.Miller et al., Photonics Rules of Thumb, 2nd ed., 2003, pp. 341-342, SPIE Press-McGraw Hill, New York, NY.

(Continued)

*Primary Examiner*—Amare Mengistu
*Assistant Examiner*—Dmitriy Bolotin
(74) *Attorney, Agent, or Firm*—Caesar, Rivise, Bernstein, Cohen & Pokotilow, Ltd.

(57) ABSTRACT

A method and an apparatus are disclosed for determining the position of a stimulus in two axes on a surface. The apparatus includes: a transparent waveguide panel with parallel top and a bottom surfaces and at least one edge that is perpendicular to the top and bottom surfaces; a light source that is directed to the edge of the waveguide to produce light that is contained within the waveguide by Total Internal Reflection and a light detector for producing an electrical signal that is representative of an image of the light emitted by the waveguide. The light detector is positioned to receive light emitted by Frustrated Total Internal Reflection from the transparent wave guide when a physical stimulus is placed in contact with the top surface of the transparent waveguide.

14 Claims, 7 Drawing Sheets

U.S. PATENT DOCUMENTS

2004/0252091 A1 12/2004 Ma et al.
2006/0114237 A1* 6/2006 Crockett et al. ............. 345/173

OTHER PUBLICATIONS

Kieser, Gerd, Optical Communications Essentials, 2003, pp. 120-121, 197-215, McGraw Hill, New York, NY.

Daintith, John et al., Dictionary of Physics, 2005, p. 250, Market House Books, Ltd., Aylesbury, UK.

Canoiu, J., Passive Infrared Detection, 1999, pp. 325-350, Kluwer Academic Publishers, Boston, MA.

Johnson, M., Photodetection and Measurement: Maximizing Performance In Optical Systems, 2003, p. 4, McGraw Hill, New York, NY.

* cited by examiner

PHOTONIC TOUCH SCREEN APPARATUS AND METHOD OF USE

CROSS-REFERENCE TO RELATED APPLICATIONS

This application claims priority to, and the benefit of U.S. Provisional Application No. 60/665,727, filed Mar. 28, 2005 for all subject matter common to both applications. The disclosure of said provisional application is hereby incorporated by reference in its entirety.

FIELD OF INVENTION

This invention relates generally to input devices for display screens and more particularly to a system and method for detecting the position of a finger or similar object on a flat transparent surface for use as an interactive two dimensional position input device in conjunction with pointer(s) displayed on a computer or other display screen.

BACKGROUND

Pointer input devices, such as mice, touch pads and the like have been integral parts of computer systems since the advent of graphical user interfaces. In many instances, such as self serve ticket vending terminals and automated teller machines, these devices are impractical and direct tactile contact with the computer screen is the preferred input mode. The variable display on the screen, coupled with the ability to sense the presence and position of a finger on the screen itself provides an efficient means for information entry, whether it is by display of a full keyboard for alpha-numeric entry such as ticket holder name or more limited "buttons" to press for selections, that can then be changed when a new screen is displayed. Use of such on-screen input, commonly termed "touch screen" technology eliminates moving parts and wearable contacts required for keyboards and physical buttons and switches and is ideal for many environments.

The touch screen as a tool for graphical user interface (GUI) with a computer is inherently more intuitive, and faster than alternatives such as the mouse or the light pen. The mouse or the light pen is precise but slow, translating the dexterity of the human hand to tedious positioning of a single indicator icon on a screen. The mouse or light pen is difficult to place briefly for high-speed applications such as music composition, game playing, and free hand drawing.

Touch screen technology has largely been implemented with transparent sheets placed over a display screen, wherein the sheets have variable electrical properties (capacitive, resistive, piezo-electric, acoustic, breakbeam IR) that can sense when pressure is applied to a particular area of the sheet. A drawback of the sensing sheets technologies is that the sheets are necessarily less hard and less durable than the glass or other clear panel of the underlying display. Hence these sheets are prone to wear and damage. The breakbeam IR gives false positives. Thus, there is a need for a reliable touch screen technology that works with a clear, sealed panel that is at least as durable as a typical display screen made of glass or acrylic.

Additional disadvantages of current touch screen technology are the high cost of large screens, degradation in screen clarity and excessive bulk that limits the ergonomic adjustment for access to large touch screens. The touch screens in current use are scalable to large size only with substantial increase in cost and bulk, and constrained in the number of simultaneous input positions that can be entered simultaneously, typically one.

Multiple-signal processing with rapid positioning would enable new applications such as rapid manual sorting and positioning of icons on the screen, game playing applications, document creation, music creation, art-work creation, multiple user use, and many other current and future applications.

The optical effect known as Frustrated Total Internal Reflection (FTIR) can be used to detect where an external object has touched a clear optical waveguide. Normally, light transmitted into the edge of a waveguide, which can be a simple flat piece of glass, will not escape the waveguide (e.g., the top or bottom surface of the transparent plastic or glass). When an object, such as a finger, is placed on the surface, however, the index of refraction (versus what was previously just air) is changed and the FTIR takes place. In such a case wherein light will now not be reflected at this point, and partly escapes from the wave guide. The light reflected from the finger is reflected in different directions, including through or out of the waveguide, and within the waveguide in different directions. For a flat piece of transparent plastic or glass, this effect would cause light to leave the surface of the transparent plastic or glass opposite of where a finger is placed. For example, if the edge of a sheet of transparent plastic or glass is evenly illuminated and one touched one surface of the transparent plastic or glass, the area under the point of contact would light up as viewed from under the point of contact. This optical phenomenon is well known, but to date, efficient, robust devices have not been developed to exploit FTIR to produce an effective touch screen input device. The wave guide can be flexible. So long as the material's flex stays within Snell's angle.

BRIEF SUMMARY OF THE INVENTION

A method and an apparatus are disclosed for determining the position of a stimulus in two axes on a surface. The apparatus includes: a transparent waveguide panel with parallel top and a bottom surfaces and at least one edge that is perpendicular to the top and bottom surfaces; a light source that is directed to the edge of the waveguide to produce light that is contained within the waveguide by Total Internal Reflection and a light detector for producing an electrical signal that is representative of an image of the light emitted by the waveguide. The light detector is positioned to receive light emitted by Frustrated Total Internal Reflection from the transparent wave guide when a physical stimulus is placed in contact with the top surface of the transparent waveguide. Several embodiments are presented. These include embodiments where the emitted FTIR light is detected with a two-dimensional detector, such as a camera or a charge coupled device, either of which can be placed below the waveguide. Additional embodiments include detectors placed along an edge of the waveguide where the position of light emitted along one edge and the position of light detected along a second edge are determined to locate the position of the stimulus on the surface of the waveguide. Further embodiments include placing discrete light sources along two edges of the waveguide, detecting the presence of light emitted by FTIR and determining which of the light sources caused the light to be emitted by FTIR.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
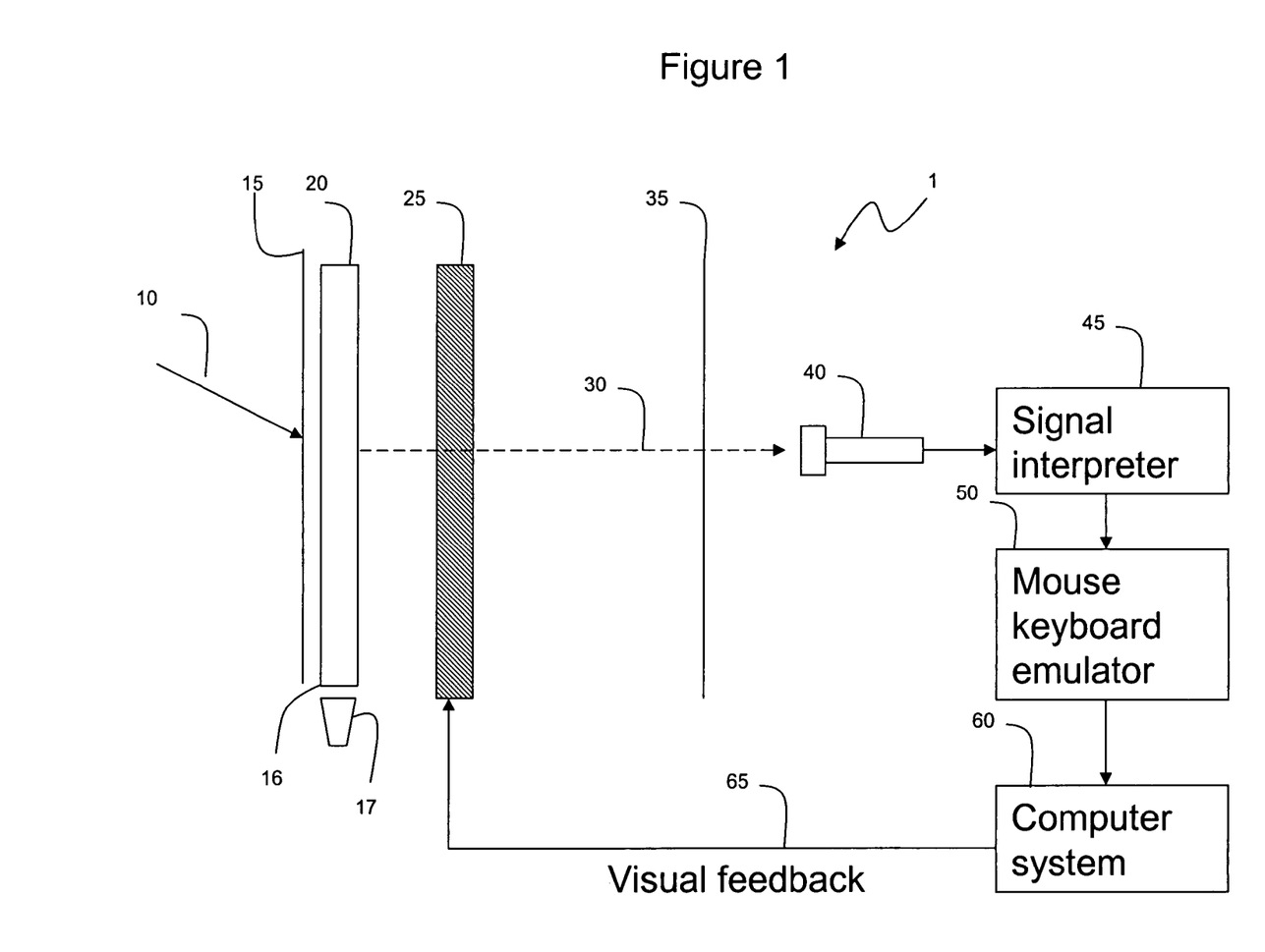
FIG. 1 is a side view of an exemplary touch screen position input display system constructed in accordance with this invention as part of a computer system (shown in block diagram form)

Referring now to the drawings wherein like reference characters relate to like parts there is shown one basic exemplary embodiment of a touchscreen panel system 1 for providing position input to a computer display. Element 25 is an LCD or other computer display screen, such as an OLED display. The screen receives its images from a computer system 60. Element 20 is a transparent panel, which is flooded with light on its edge 16 by a lighting element 17. A physical input stimulus 10, which can be a finger or other pointing implement, is shown touching a silicone sheet 15 located over the element 20. The sheet 15 is in optical interface contact with the panel 20. Due to the effect of Frustrated Total Internal Reflection (FTIR), a light ray 30 is refracted out of the panel 20 where the stimulus 10 touches the panel. The silicone sheet 15 indents to interface more closely to the touch panel 20 creating a more uniform response to the stimulus 10, so that different sized pointers and fingers applied to panel 20 produce a more uniform and consistent refraction and reflection leading to light ray 30. The silicon sheet 15 is optional. The same effect can be achieved by pressing the finger directly on the transparent plastic or glass. The touch surface of panel 20 may also be treated to achieve a more complete and uniform contact with the panel, so that different sized pointers and fingers applied with different pressures to panel 20 produce a consistent refraction and reflection leading to the light ray 30. The light ray 30 is passed through a filter 35 to extract unwanted light and enters a photodetector or camera 40. In the exemplary embodiment shown, the camera 40 can be a CCD camera with a two dimensional array of photo sensors. The image created on the camera 40 shows the location of the source of the light ray 30 relative to the display screen 25. A signal interpreter 45 converts the image of the light ray 30 received by the camera 40 into an x/y position data signal. In an embodiment where the touchscreen 20 is used to move an on-screen pointer, mouse/keyboard emulator 50 receives the x/y position data signal and sends location data for a mouse pointer to the computer system 60. The computer system then provides visual feedback 65 by displaying a pointer on the screen, in the same position as the stimulus 10. In an embodiment where the touchscreen is used as a key entry device, wherein the display screen displays alpha numeric keys or dedicated function keys, a mouse/keyboard emulator 50 converts the x/y position of stimulus 10 into a signal indicating that a particular key was pressed.

The FTIR effect is well known to those skilled in the art and is explained, for example in J. Daintith and R. Rennie editors, The Facts on File Dictionary of Physics 4th ed., 2005, p. 250. "The total reflection of radiation that can occur in a medium at the boundary with another medium of lower refractive constant. In such cases, rays incident at small angles will be refracted 'away from the normal'; in other words, the angle of refraction (r) is greater than the angle of incidence (i). Because r is greater than i, it is possible to increase i to a value at which r is 90 degrees (or just under). That value of i is called the critical angle c. The relation for the refractive constant for radiation entering this medium is: 1n2=1/sinc." This is an expression of Snell's law as explained further below. "If i is increased still further, refraction cannot occur. The radiation must then all be reflected. Normally, when radiation meets the boundary between two media some will be reflected and some will be refracted. Total internal reflection is the only exception—here all the energy is reflected. Because of this, optical instruments often include totally internally reflecting prisms rather than mirrors. The critical angles of optical glasses at visible wavelengths are typically 40 degrees or less."

The internal surface of the panel 20 acts as a waveguide which reflects the light from the stimulus, e.g., finger, 10, as regular, or specular reflection, according to Snell's law n=1/sinc . The rough surface of the finger acts as a substantially lambertian or diffuse isotropic reflector, equally bright if viewed from any direction. The diffuse reflection, emits substantially equally over 2 pi steradians, so any detector below the surface may detect the reflection, and any detector along the path of secondary reflections of the FTIR may also detect the light. For a discussion of lambertian reflection, see Friedman E., Miller J. L., Photonics Rules of Thumb 2nd edition 2003, SPIE Press-McGraw Hill New York, pp 341-42. For a diagram of the radiance pattern of a lambertian source compared with a highly directional source, such as a laser diode, see Keiser, G. Optical Communications Essentials McGraw-Hill New York 2003, pp 120-121 The use of FTIR for a pointing device of limited size is disclosed in U.S. Pat. No. 6,320,177 to Sayag and the optical effect is described therein at column 6, lines 4-25 and FIGS. 2 and 3. The entire disclosure of Sayag is incorporated by reference herein.

Figure 2:
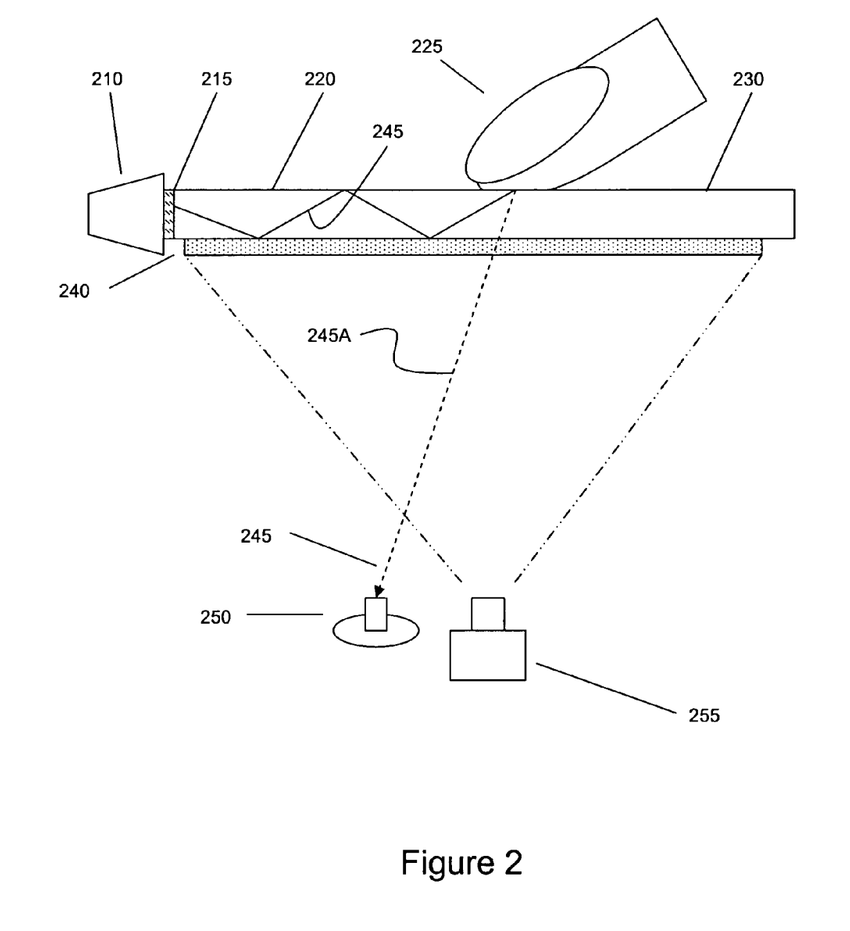
FIG. 2 is a side view of an exemplary touch screen position input display system for a projection type display.

An embodiment of a touch screen system 1 based on FTIR is shown in FIG. 2, which is a side view of a touch screen system wherein the display is not an LCD, but rather a projected display. The display screen 240 is a semi-transparent screen that displays an image projected by a projector 255. The image is viewable through the touch screen 220, which acts as a waveguide as described below. Light is provided from collimated light emitting diodes 210 with one or more defined spectra or modulation patterns, filtered by one or more optic filters 215, into the side of a waveguide or panel 220. The light ray 245 strikes the inside surfaces of the waveguide panel at less than the critical angle until the user's finger 225 is applied to the panel surface. This action changes the critical angle, spoils the reflection, producing frustrated total internal reflection (FTIR). In embodiments where the source light ray 245 is modulated with a signature, the FTIR ray also carries that signature. A video camera or CCD device 250 detects the FTIR light ray 245A from the panel 220. The video camera is indexed to the position of the images projected on the screen so that placing a finger 225 on the screen will result in the projection of a pointer image (or simulation of a key pressed if applicable) at that location on the display. The camera 250 may contain a filter that allows the FTIR light ray 245A of a certain wavelength to pass, but filters out unwanted frequencies that would flood the camera 250 with light and make it difficult to discern the FTIR image along with any modulation signature that image may contain.

Figure 3:
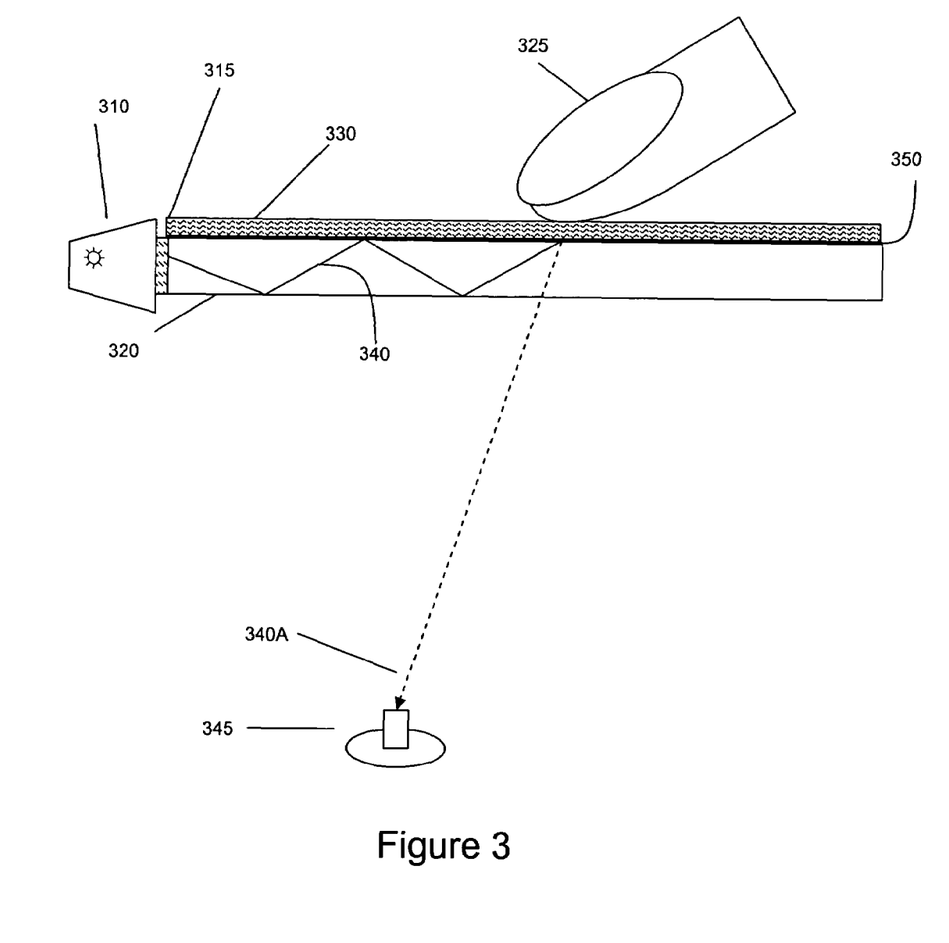
FIG. 3 is a side view of an exemplary touch screen position input display system for an LCD display.

FIG. 3 shows a side view of an embodiment for a touch panel 320 used with an LCD display screen 330. The LCD display screen 330 displays an image visible from the top, i.e., viewable from the top of the page looking to the bottom of the page. In this embodiment, the stimulus, which can be a finger 325 is applied to the LCD panel 330 and that pressure is transmitted through the panel to an interposed silicon sheet 350 and onto the LCD touch panel 320. The silicon sheet 350 helps ensure that pressure applied to the LCD panel 330 is transferred to an affirmative contact with the touch panel 320. Light is provided from collimated light emitting diodes 310 with one or more defined spectra or modulation patterns, filtered by one or more optic filters 315 so that the light enters the edge of the waveguide panel 320. The light ray 340 strikes the inside surfaces of waveguide-panel at less than the critical angle until a finger 325 applied to the panel surface changes the critical angle, spoils the reflection, producing frustrated total internal reflection (FTIR). A video camera or CCD device 345 detects the light ray 340A from panel 320. The video camera is indexed to the position of the images displayed on the LCD panel so that the placing of a user's finger 325 on the screen will result in the display of a pointer image (or simulation of a key pressed if applicable) at that location on the display. The camera 345 may contain a filter that allows the FTIR light ray of a certain wavelength to pass, but filters out unwanted frequencies that would flood camera 345 with light and make it difficult to discern the FTIR image. Because the LCD panel 330 inherently polarizes any light that passes through to the touch panel 320, it is contemplated that a second polarizing filter can be located between the LCD and the touch panel to block unwanted light that would constitute noise in the touch panel detection devices, in this case video camera or CCD device 345.

In further embodiments described below, detection of the FTIR light ray is made with detectors at an edge of the waveguide that is perpendicular to (or at some angle other than directly across from) the edge through which the light entered. Detection in this manner, as opposed to that described above where the detector is below the broad surface of the waveguide opposite the stimulus, is possible because the disturbance caused by the placement of a stimulus on the waveguide causes a lambertian reflection that produces light rays inside the waveguide that radiate in all directions from the point of contact.

Figure 4:
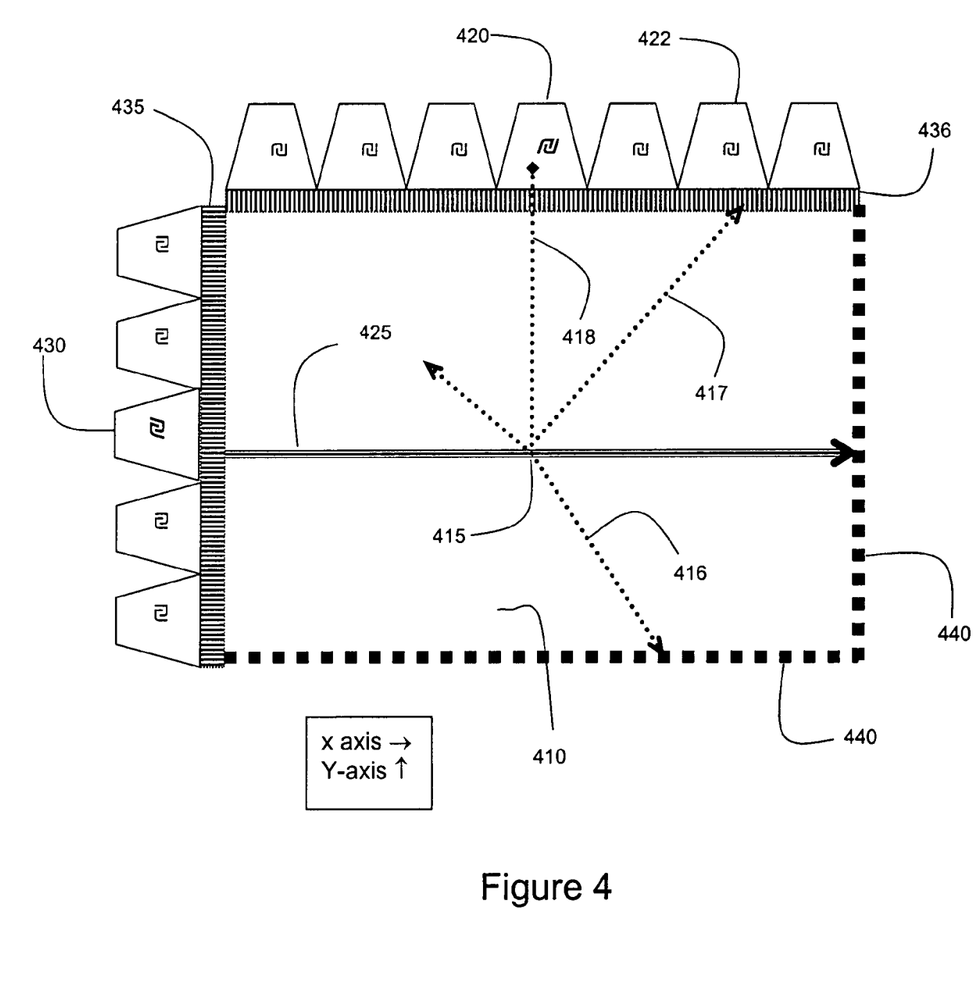
FIG. 4 is a top plan view of an exemplary touch screen position input device with light sources on one axis and light detectors at an axis 90 degrees to the source axis.

A touch panel with optical sensors on the panel edge is shown in FIG. 4 representing what can be termed "one axis emission, one axis detection." In the embodiment shown in FIG. 4, collimated edge detection is used. This can reduce cost and mechanical complexity over embodiments using a two dimensional detector, such as a camera or CCD, that sits below the plane of the touch screen. FIG. 4 shows a touch panel waveguide panel 410, with an optical source on the y axis such as a set of light emitting diodes (LED) 430. As shown, a single LED, 430 is emitting light which is collimated through a lens-collimating element 435, which can be as simple as a set of opaque septa along the Z axis on the panel edge. In a further embodiment, at least one cylindrical lens can be placed in the LED output, which would also help collimate the source and the septa would enhance this. The septa can be very fine and will prevent retrograde collimation. The collimated light beam 425 that results is of a convenient width to contain sufficient light for detection of FTIR that is propagated along the x axis of touch panel 410. The collimation of the light beam, which can also be enhanced by using a collimated LED 430, creates a beam of light 425 that is substantially constrained by collimation to minimize divergence in the y axis, and constrained by TIR in the z axis (normal to plane shown). A finger (not shown) produces FTIR at the point of contact, e.g., point 415, creating exemplary rays of light inside the panel, and shown as dotted lines 416, 417 and 418. Collimation 436 ensures that only light rays that are substantially perpendicular to the x axis reach x axis detectors 420. FTIR rays that are perpendicular 418 are substantially detected retrograde through the lens/collimation interface 436 interface only by a tuned detector 420 geometrically aligned with point 415 along the x-axis. Stray FTIR rays 416 that do not interact with detector 420, or do not reach that edge on which detector 420 is located, are prevented from off axis reflection at an edge dump baffle 440 such as a fine comb edge contour to dump power via multiple reflections and absorptions or sintered edges that may be filled with paint with high absorptance for the light spectrum in effect combining specular elements that minimize the further diffusion of the light and absorption of light. The opposing edge for each axis also reflects back any light that has arrived on axis. Other stray FTIR rays, e.g. 417, that reach the detector edge at angles other than 90 degrees are effectively absorbed by the lens-collimation interface element 436 covering that edge, reducing the detection by other detectors, e.g., 422 off of the perpendicular axis. These and other measures apparent to those skilled in the art can improve resolution by minimizing the light reaching detector 420 from off the primary alignment axis.

In the embodiment shown in FIG. 4 and described above, X/Y location of the stimulus applied at point 415 is determined as follows. LEDs on the Y axis are illuminated one at a time. Only the LED 430 that is horizontally aligned with stimulus point 415 will have its light reflected in multiple directions by FTIR. Thus, the Y axis location of the stimulus is known because the particular LED that caused a response in the detectors is known. Likewise, only one detector 420 will receive reflected light at 90 degrees from the stimulus point 415. Thus, the X axis location of the stimulus point is known.

Pseudo code describing an embodiment of a method for locating a stimulus where a light source of known origin is on one axis and a plurality of light detectors of known location are along another axis is presented below, where:

$e(x)$ is a function indicating emission of photons from a known location x on an x axis.
  $n$ = spatial resolution on an axis
    $xn$ = the number of discrete light emission positions along an x axis
    $yn$ = the number of detectors along a y axis
    $d(y)$ is a function that returns a light intensity level at a sensor located at position y on a y axis
    $t$ = signal to noise threshold
$p(x,y)$ = touch point
for (x = 1 to xn){
  e(x)
    for( y = 1 to yn)
    {
      if (dy > t) { record p(x, y)}
    }
}

Figure 5:
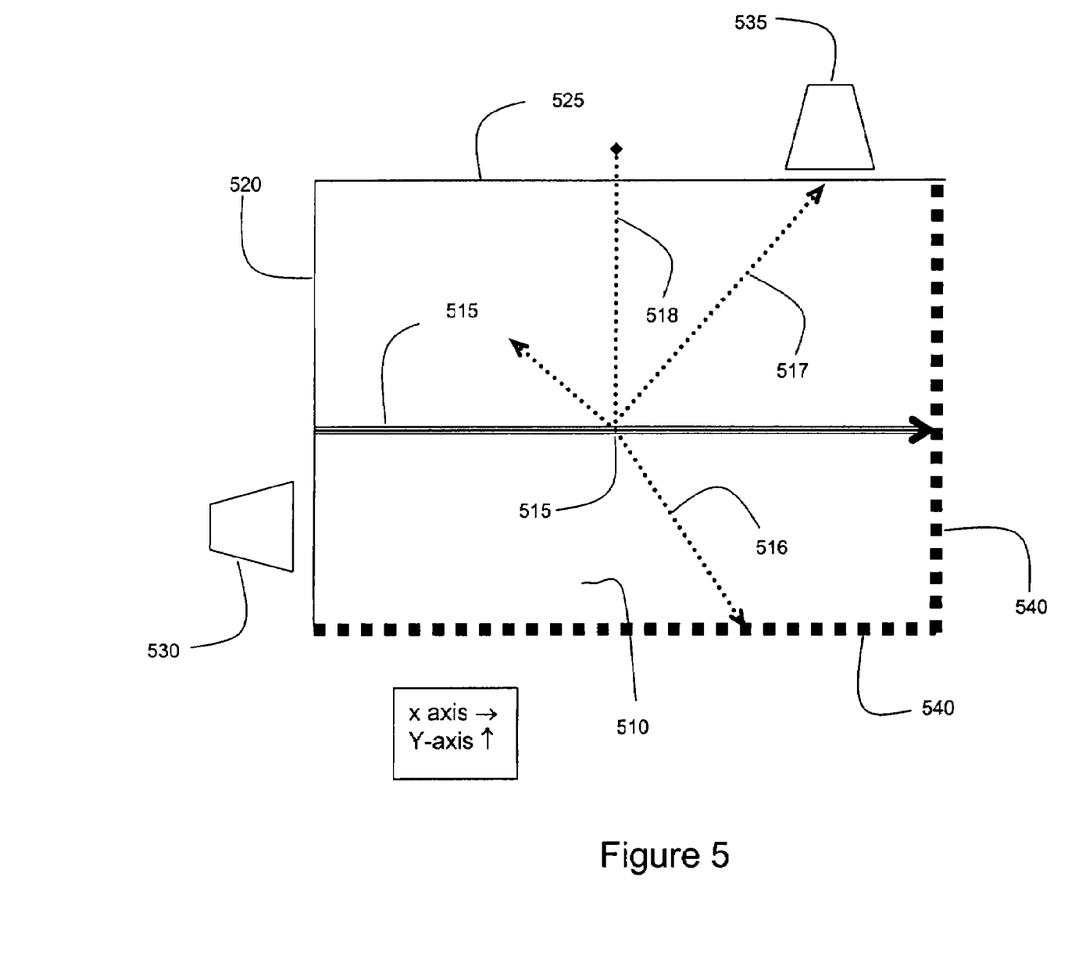
FIG. 5 is a top plan view of an exemplary touch screen position input device with a limited number of detectors and light sources on two axes.

In a further embodiment of a touch panel employing FTIR shown in FIG. 5 and representing what can be termed "dual axis illumination, single point detection" photons are selectively emitted along both the x and y axes, and a single point photo detector, or a plurality of detectors can be placed anywhere, so long as they have a full field of view of the panel and the detector is not located facing the emission point. In this embodiment one could use as a detector a phototransistor, photo resistors, CMOS with adequate frame rate, a photovoltaic element or even the array of photodiodes along the opposing axis. The use of an LED as both an emitter and a detector is discussed in Johnson, M. "Photodetection and Measurement: maximizing performance in optical systems" McGraw-Hill New York 2003, p. 4 and elsewhere in that volume.

In this embodiment, a laser beam is preferably scanned across the x and y axis edges of the touch panel wave guide. The location of the laser beam is known at all times. When the beam scans past a point on the x axis that is in line with a stimulus touching the panel, FTIR is created, causing reflections throughout the panel. In this embodiment, it is not necessary to detect any particular reflection, detecting any one will suffice to indicate that the laser beam hit a point on the x axis across from the stimulus point. This, in conjunction with the knowledge of the point on the x axis at which the laser beam was introduced into the panel, establishes an x axis location. Similarly, the laser beam is scanned across the y axis to establish a y axis point for the stimulus location. For scanning, an optomechanical scanner designed to enable spatial analysis of an optical source may be used. One skilled in the art can readily appreciate that there are a number of ways to scan the laser beam to cover each edge while retaining the information of where the beam is pointing at any particular time. For a discussion of many of the options, see Canoiu, J. Passive Infrared Detection, Kluwer Academic Publishers, Boston, 1999; pp 325-350. On page 350 he states, with reference to scanning methodology, "The principal image analysis instruments in rectangular coordinates are the following: the oscillating plane mirror is compact, the highest scanning speeds are obtained at resonance frequency; the rotating drum mirror being mechanically balanced, the induced vibrations are minimal as well as having very high rotation speeds; the rotating refractive prism is equally a mechanically balanced mechanism, it leads to an optically simplified architecture."

In another embodiment, instead of a laser, a selective mask may expose the emission source to optical paths, which can be, for instance, optical fibers, to produce a scan effect, with different source signatures likewise applied to each scan element.

In an embodiment shown in FIG. 5, one detector 530 is placed on the y axis 520 and one detector 535 is placed on the x axis 525. A laser beam 515 is shown in a position that intersects stimulus point 515. FTIR causes reflections 516, 517 and 518. As shown, it is not necessary in this embodiment that the detector be at 90 degrees from the stimulus point of contact with the laser beam. The detector 535 detects the reflection 517. That is sufficient to determine that the stimulus point is at the y axis position where the laser beam is located. In addition, signature information tied to the emission's location on the panel, can be embedded in the emission, which would also provide a way to localize in any coordinate system the FTIR emission, i.e., pinpoint where the emission came from. Antireflective materials or surface finishes 540 are placed at edges opposite the incoming laser beam to avoid any aliasing produced by unintended secondary TIR that may produce FTIR at an unintended second site. The unique address of each site of FTIR enables the detection of multiple signal sources at different places substantially at the same time. At least one operative system accomplishes the detection but multiple detection systems may operate independently or in concert for scalability of the system to desired size.

The following pseudo code describes an embodiment of a method for locating a stimulus where a light source of known origin is emitted on two axes and having single or multiple light detectors with a collective field of view capable of detecting FTIR reflections for any stimulus position of interest s, where:

e(x) is a function indicating emission of photons from a known location x on an x axis.
e(y) is a function indicating emission of photons from a known location y on a y axis.
    n = spatial resolution on an axis
    xn = the number of discrete light emission positions along an x axis
    yn = the number of discrete light emission positions along an x axis
    d is a light intensity level at a sensor, whose location is not known
t = signal to noise threshold
p(x,y) =touch point.
for (x = 1 to xn){
  e(x)
  if (d > t) { record x}
  for (y = 1 to yn){
  e(y)
  if (d> t) { record y}
  }
}

Figure 6:
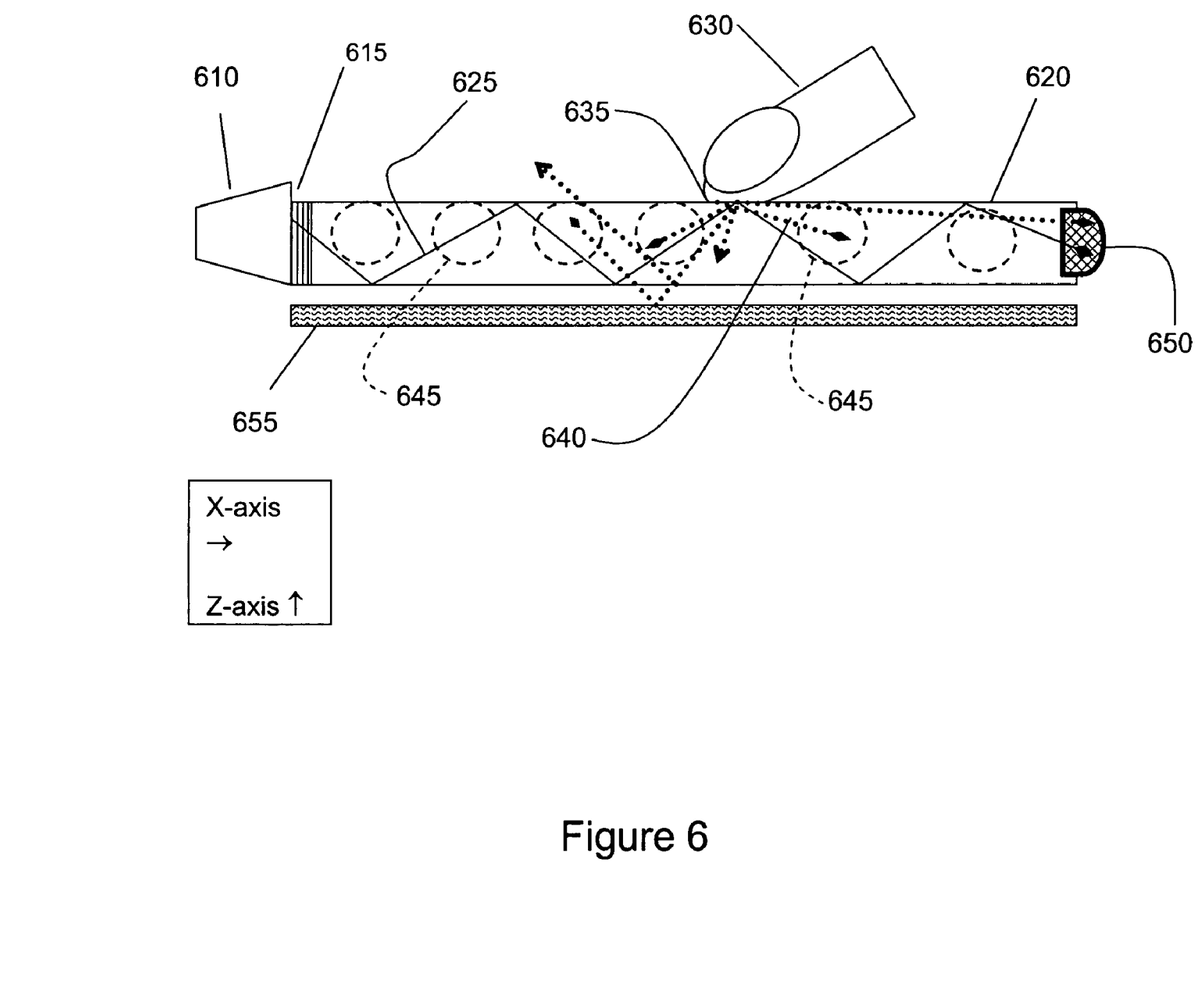
FIG. 6 is a side view of an exemplary touch screen position input device with light sources along one axis and detectors along an axis at 90 degrees to the source axis.

FIG. 6 shows a side view of an embodiment, such as discussed above for FIG. 5, wherein only a limited number of photo detectors is required. In this embodiment, an emissions source 610, such as a laser source or optical source, produces coherent, collimated light and is propagated through lens/collimation interface 615 as a beam to enter a touch-panel 620 glass or plastic waveguide that is surrounded by air. A light ray 625 radiance pattern directed along the x-axis is collimated to constrain the beam to a substantially narrow beam path in a y-axis normal to the plane of the figure as illustrated. The beam 625 is confined in the z axis by total internal reflection (TIR) within the panel 620. A surface of finger 630 placed at point 635 on the panel raises the refractive constant at the boundary of the waveguide, producing FTIR 635. The surface of finger 630 applied to the panel produces diffuse reflection, scattering the beam randomly at that point 635 substantially lambertian reflection, with example rays shown as beaded light rays 640.

FTIR is sensed by at least one of plural tuned photo-detector 645 in the path of the beam 640. The detectors are shown as dashed circles, e.g., 645, and are placed on an x axis edge of the wave guide. The detectors 645 can be in any location that can intercept any primary or secondarily reflected FTIR ray passing through any edge or surface of panel. The detectors can phototransistors, photo resistors, CMOS with adequate frame rate or photovoltaic. The detectors 650 may be provided in the position to receive light directly from the source 610, but are disabled when light is coming directly from that source. The touch panel may be of any shape, with corresponding triangulation maneuvers for localization of FTIR. Preferably, the light emission spectrum of the optical source 610 differs from the visible emissions of the display 655. In a similar manner, any required number of finger 630 positions may be localized, at any time. As summarized by Canoiu, (Canoiu, J. Passive Infrared Detection, Kluwer Academic Publishers, Boston, 1999; pp 325-350), on page 350, "Multielement detectors enable an improvement in the signal to noise ratio. They can be used just as easily for analysis in a circular or rectangular system of coordinates. In the second case, depending on the array geometry and its positioning with respect to the scanning direction we distinguish between serial, parallel and serial-parallel modes[:] in serial mode, the same image point is analysed successively by several detectors arranged in the direction of scanning; an improvement of the signal to noise ratio is obtained by integration of the element signals in synchronism with the scanning; in parallel mode, several rows are analysed simultaneously; for a given same frequency, the scanning speed is therefore lower and the noise bandwidth is reduced; serial-parallel mode combines the advantages of both scanning modes.

In all cases, the gain of the signal to noise ratio is [theoretically] equal to the square root of the number of detectors."

In a preferred embodiment, touch panel 620 is superimposed on a display 655, such as a flat panel liquid crystal display (LCD) from a computer display, screen from a projection display, or other display so a user's finger 630 may index any corresponding point 635 on the display 655. The processing as discussed elsewhere in this document will occur to create an icon representing the finger position. As described above, with respect to FIG. 3, in another embodiment the touch detection panel can be under the LCD display. In alternatives to the preferred embodiment, the display 655 may be separate from or remote from the touch panel 620, or an equivalent repeater display 655 may be used, providing an operator visual information on finger 630 position. In alternatives to the preferred embodiment, the touch panel may be of any convenient shape, with corresponding modifications of the mechanical, electronic programming, and computational components. Any collimation of FTIR localization may computationally contribute to localization. Detectors may be physically collimated using mechanical septa that preferentially localize light along select axes for parallel collimation, or at focal points for non-parallel collimation. Lensed detectors directed to an indexed detection surface such as a video camera may collimate alternative, light sources.

Figure 7:
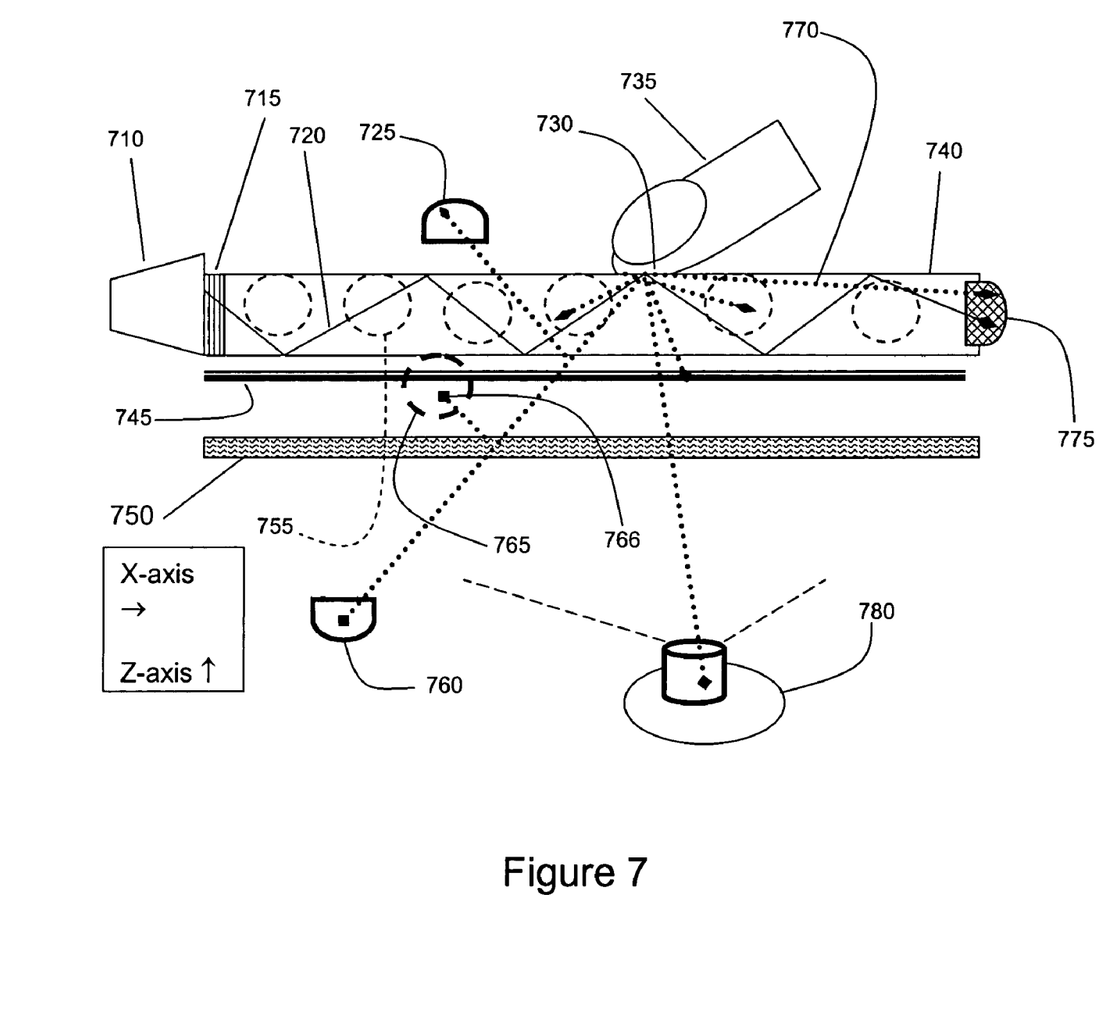
FIG. 7 is a side view of an exemplary touch screen position input device with light sources along at least one axis and showing a plurality of detector position embodiments.

As shown in various exemplary embodiments represented in FIG. 7, the detector(s) may be in any location that may intercept FTIR, either primary or by reflection. FIG. 7 shows a light source 710 located along at least one axis, a filter 715, a light ray 720 emitted by the source 710 in waveguide touch panel 740, with stimulus (e.g., finger) 735 contacting the touch panel at point 730 and producing FTIR rays, e.g. 770. Options for light detectors, which can be employed either singly or in combination, include above the touch panel 725, at edges of touch panel 755 as also described above in FIG. 6. The detector 765 can be under the touch panel configured so as to receive the FTIR by reflection 766 off the underlying display panel 750. The detector 745 can be under the touch panel in the form of a planar translucent detector, such as a photovoltaic element. The detector 760 can be under the touch panel using a photo detector without a fine lens and configured to detect any emissions through the display 750. The detector 780 can be at least one video camera producing an image matrix of the field of view and be placed under the touch panel. In these last two embodiments, the display panel would be above the touch detection panel with a silicon sheet between the two, as described in detail above with respect to FIG. 3.

Non-functioning surfaces, such as touch panel edges not occupied by an optical source 710, the housing of the device, and other surfaces are potentially sources of unwanted reflection of FTIR, depending on the particular detection arrangement selected. These surfaces are to be micro-baffled, granulated and painted as shown ay 775 or otherwise treated to reduce stray reflections according to any convenient method such dull paint surface with high absorption for the colors of interest.

Embodiments that use a two dimensional detection device such as a camera or CCD array do not require that the source of light be known. The two dimensional sensor can inherently determine the x/y coordinates of the stimulus because the FTIR image is sensed in two axes relative to the field of view of the two dimensional sensor. Embodiments that rely on single point detectors or multipoint one dimensional detectors (i. e., a row of detectors along the waveguide edge) require that the position of the light source be known or "localized" in order to fix a position for the stimulus along the axis or waveguide edge from which the light is being emitted. In one embodiment, the light source is sequenced or scanned across the waveguide edge, under the control of a processor. Because the processor knows which source it turned on or where the source is, in the case of a scanned laser beam, the localization information is known. In another embodiment, the light source can be modulated with a signature that uniquely identifies the location of origin of the light source. In this embodiment, when an FTIR reflection is sensed, circuitry receiving the signal from the detector can decode the signature to determine the position of the light source that caused the FTIR reflection.

The signature of an optical source is defined as known localization and any corresponding modulation of the source including carrier wave that facilitates distinguishing that source from any other source such at time active, wavelength division multiplexing, (See Keiser, G. Optical Communications Essentials McGraw-Hill New York 2003, pp 197-215, and other active and passive source or detector manipulations, including tunable devices summarized on page 172.) Localization of a source may be based on construction of the device, or established by testing and calibration of the system.

The principle mechanism for signal to noise isolation is modulation of the photon source. A typical frequency for this is 20 kHz to 40 kHz, although higher frequencies can also be used. Modulating the light source and synchronizing the detectors with the modulated light source eliminates stray light as a potential "hit" or detection of FTIR. Because stray ambient light or light from the display will not have the modulation "signature" and only the touch panel source illumination has that modulation frequency, all other light sources will be ignored.

Another technique to limit the effect of ambient noise is to use infrared wave length sources at wavelengths not found in ambient radiation. Examples are 850 nm IR laser, 880 nm IRLED or 940 nm. Narrow band optical filters at these wavelengths are placed on the detectors. When an LCD is used as a display and is on top of the touch detection panel, a polarizing filter at 90 degrees to the polarization of the LCD panel can be used between the LCD display and the touch detection panel to limit ambient light noise.

In embodiments where both axes are employed for emission and the modulation is known, noise received while no emission is present is subtracted from when a candidate signal is received.

In embodiments where one axis employed for emission and a plurality of detectors is arrays along the other axis, a comparison can be made between a candidate signal with the average of the other detectors or a control detector. A candidate signal can also be compared to measured intensity levels before and after reception of the candidate signal and a threshold can be set whereby a candidate signal is read as a positive detection of a stimulus based on the difference in measured the drop-off in intensity level. In another embodiment, an ambient light level detector can be used as a standard against which the output of the waveguide detectors is measured.

A number of source modulation options are available to provide signatures for the optical source localization employed in this device. The high information rate requirements for voice, video, and data services for optical communications have resulted in technical approaches with corresponding detection and analysis methods that are applicable to the present invention. Many of the methods applicable to the current invention including wave division multiplexing, optical link design, performance measures, performance impairments, measuring standards, manufacturing issues and many other practical considerations are well known to those skilled in the art, and partly incorporated in Keiser, G Optical Communications Essentials McGraw-Hill New York 2003, Johnson, M. "Photodetection and Measurement: maximizing performance in optical systems" McGraw-Hill New York 2003.

While the invention has been described in detail and with reference to specific examples thereof, it will be apparent to one skilled in the art that various changes and modifications can be made therein without departing from the spirit and scope thereof.

What is claimed is:

1. An apparatus for determining position of a stimulus in two axes on a surface, comprising:
   A transparent waveguide panel having a top and a bottom surface, which surfaces are parallel to each other, and at least one edge, which is perpendicular to said top and bottom surfaces;
   a light source directed to said at least one edge wherein said light source is configured to produce light that is contained within said waveguide by Total Internal Reflection;
   a light detector for producing an electrical signal representative of an image of light received;
   a first edge on said transparent waveguide panel having a first edge length, which first edge is perpendicular to said top and bottom surfaces;
   a second edge having a second edge length, which second edge is perpendicular to said top and bottom surfaces and which is at an angle to said first edge;
   wherein said light detector is positioned to receive light emitted by Frustrated Total Internal Reflection from said transparent waveguide when a physical stimulus is placed in contact with said top surface of said transparent wave guide;
   wherein said light source is directed to said first edge to produce a plurality of discrete light rays that are contained within said waveguide by Total Internal Reflection and wherein each of said discrete light rays has an emission location which is along the first edge length of said first edge; and
   wherein said light detector is comprised of a plurality of discrete light detecting elements distributed along the second edge length of said second edge, said light detecting elements configured to produce an electrical signal representative of light intensity emitted by Frustrated Total Internal Reflection at said second edge when a physical stimulus is placed in contact with said top surface of said transparent wave guide, each light ray detector having a light ray detection location.

2. The apparatus of claim 1 further comprising:
   a flat panel display having a viewing side and a back side; and
   a pressure transferring medium; wherein
   said pressure transferring medium is on top of said top surface;
   said flat panel display is on top of said pressure transferring medium with said back side facing said pressure transferring medium; and
   said physical stimulus is transferred through said flat panel display and said pressure transferring medium to said transparent waveguide panel.

3. The apparatus of claim 1 wherein said light source is modulated and said light detector is tuned to receive light only of the same modulation as said light source.

4. The apparatus of claim 1 further comprising:
   signal processing circuitry for associating at least one of said light ray emission locations with at least one of said light ray detection locations.

5. The apparatus of claim 4 wherein said light source is selected from the group consisting of a plurality of light emitting diodes (LEDs) and a laser.

6. The apparatus of claim 1 further comprising:
   a flat panel display having a viewing side and a back side wherein said flat panel display is directly below said bottom surface of said transparent waveguide panel, with said viewing side facing said transparent waveguide panel.

7. The apparatus of claim 1 wherein said light source is modulated with a signature, and said signature is different for each of said plurality of discrete light rays, said apparatus further comprising:
   signal processing circuitry coupled to said plurality of discrete light detecting elements for demodulating said signature and determining which of said discrete light rays caused said light intensity emitted from said waveguide by Frustrated Total Internal Reflection.

8. An apparatus for determining position of a stimulus in two axes on a surface, comprising:
   A transparent waveguide panel having a top and a bottom surface, which surfaces are parallel to each other, and at least one edge, which is perpendicular to said top and bottom surfaces;
   a light source directed to said at least one edge wherein said light source is configured to produce light that is contained within said waveguide by Total Internal Reflection;
   a light detector for producing an electrical signal representative of an image of light received;
   a first edge, having a first edge length, on said transparent waveguide panel, which first edge is perpendicular to said top and bottom surfaces;
   a second edge, having a second edge length on said transparent waveguide panel, which second edge is perpendicular to said top and bottom surfaces and which is at an angle to said first edge;
   wherein said light detector is either a single element light detector or a linear light detector positioned to receive light emitted from said transparent waveguide panel by Frustrated Total Internal Reflection when a physical stimulus is placed in contact with said top surface of said transparent wave guide;
   wherein said light source is directed to said first edge to produce a plurality of discrete first edge light rays that are contained within said waveguide by Total Internal Reflection wherein each of said discrete first edge light rays has a first edge emission location which is along the first edge length of said first edge;
   wherein said light source is further directed to said second edge to produce a plurality of discrete second edge light rays that are contained within said waveguide by Total Internal Reflection and wherein each of said discrete second edge light rays has a second edge emission location which is along the second edge length of said second edge; and wherein said light detector is configured to produce an electrical signal representative of light intensity emitted from said waveguide panel from said first edge light rays and said second edge light rays by Frustrated Total Internal Reflection when a physical stimulus is placed in contact with said top surface of said transparent wave guide.

9. The apparatus of claim 8, further comprising:

signal processing circuitry for determining which of said first light source rays and which of said second light source rays caused said light intensity emitted from said waveguide by Frustrated Total Internal Reflection.

10. The apparatus of claim 8 wherein said light source is selected from the group consisting of a plurality of light emitting diodes (LEDs) and a laser.

11. The apparatus of claim 8 further comprising:

a flat panel display having a viewing side and a back side wherein said flat panel display is directly below said bottom surface of said transparent waveguide panel, with said viewing side facing said transparent waveguide panel.

12. The apparatus of claim 8 wherein:

when said light source is directed to said first edge it is modulated with a plurality of first edge signatures, and each of said first edge signatures is different for each of said plurality of discrete first edge light rays; and when said light source directed to said second edge it is modulated with a plurality of second edge signatures, and each of said second edge signatures is different for each of said plurality of discrete second edge light rays, said apparatus further comprising:

signal processing circuitry coupled to said light detector for demodulating said signatures and determining which of said discrete first edge and second edge light rays caused said light intensity emitted from said waveguide by Frustrated Total Internal Reflection.

13. A method for determining a position of a stimulus in two axes on a surface of a transparent waveguide having top and bottom surfaces that are parallel to each other and a first edge that is perpendicular to said top and bottom surfaces and a second edge that is at an angle to said first edge and that is perpendicular to said top and bottom surfaces, comprising:

directing a light source producing discrete light rays to specific emission locations along said first edge to produce discrete light rays that are contained within said waveguide by Total Internal Reflection; and detecting, at at least one specific detection location along said second edge, light emitted by Frustrated Total Internal Reflection (FTIR) from said transparent wave guide when a physical stimulus is placed in contact with said top surface of said transparent wave guide at a specific stimulus location on said top surface;

associating a specific emission location with a specific detection location when there is a detection of light emitted by FTIR at said specific detection location to determine said specific stimulus location.

14. The method of claim 13, further comprising:

modulating said light source with a signature that identifies each of said light rays detecting said signature and determining said specific emission location from said signature.

* * * * *